(12) United States Patent
Nakayama et al.

(10) Patent No.: US 7,088,749 B2
(45) Date of Patent: Aug. 8, 2006

(54) GREEN WELDING LASER

(75) Inventors: Shinichi Nakayama, Saitama (JP);
Girish Kelkar, Cerritos, CA (US);
Gregory Bates, Stevenson Ranch, CA (US)

(73) Assignee: Miyachi Unitek Corporation, Monrovia, CA (US)

( * ) Notice: Subject to any disclaimer, the term of this patent is extended or adjusted under 35 U.S.C. 154(b) by 0 days.

(21) Appl. No.: 10/337,110

(22) Filed: Jan. 6, 2003

(65) Prior Publication Data

US 2004/0131092 A1 Jul. 8, 2004

(51) Int. Cl.
*H01S 3/10* (2006.01)

(52) U.S. Cl. .......................................... 372/22; 372/28

(58) Field of Classification Search ............. 372/21–28, 372/69, 70, 93, 92
See application file for complete search history.

(56) References Cited

U.S. PATENT DOCUMENTS

| | | | | |
|---|---|---|---|---|
| 4,637,026 A | * | 1/1987 | Liu | 372/22 |
| 5,025,446 A | * | 6/1991 | Kuizenga | 372/21 |
| 5,083,007 A | * | 1/1992 | Spletter et al. | 219/121.64 |
| 5,142,542 A | * | 8/1992 | Dixon | 372/22 |
| 5,177,751 A | | 1/1993 | Kobayashi et al. | |
| 5,268,913 A | | 12/1993 | Sakowski et al. | |
| 5,365,366 A | * | 11/1994 | Kafka et al. | 359/330 |
| 5,580,470 A | | 12/1996 | Enokizono et al. | |
| 5,638,388 A | * | 6/1997 | Nighan et al. | 372/22 |
| 5,832,013 A | * | 11/1998 | Yessik et al. | 372/26 |
| 5,841,801 A | * | 11/1998 | Suzuki | 372/23 |
| 5,847,861 A | * | 12/1998 | Kafka et al. | 359/330 |
| 5,991,317 A | * | 11/1999 | Nighan et al. | 372/22 |
| 6,002,695 A | * | 12/1999 | Alfrey et al. | 372/22 |
| 6,009,110 A | * | 12/1999 | Wiechmann et al. | 372/10 |
| 6,016,324 A | * | 1/2000 | Rieger et al. | 372/25 |
| 6,130,900 A | * | 10/2000 | Black et al. | 372/25 |
| 6,157,663 A | * | 12/2000 | Wu et al. | 372/75 |
| 6,167,068 A | * | 12/2000 | Caprara et al. | 372/22 |
| 6,241,720 B1 | * | 6/2001 | Nighan, Jr. et al. | 606/3 |
| 6,287,298 B1 | * | 9/2001 | Nighan et al. | 606/10 |
| 6,373,864 B1 | * | 4/2002 | Georges et al. | 372/10 |
| 6,393,034 B1 | * | 5/2002 | Konno et al. | 372/10 |
| 6,774,881 B1 | * | 8/2004 | Karakawa | 345/84 |
| 2002/0009111 A1 | * | 1/2002 | Nighan et al. | 372/41 |
| 2002/0114553 A1 | * | 8/2002 | Mead et al. | 385/10 |
| 2003/0008448 A1 | * | 1/2003 | Kafka et al. | 438/200 |
| 2003/0035448 A1 | | 2/2003 | Yin | |
| 2004/0252734 A1 | | 12/2004 | Karpushko | |

FOREIGN PATENT DOCUMENTS

| | | |
|---|---|---|
| DE | 42 28 862 A1 | 3/1994 |
| DE | 42 28 862 * | 3/1994 |

OTHER PUBLICATIONS

Konno S et al: "Efficient High–Power Green Beam Generation by Use of an Intracavity Frequency–Doubled Laser–Diode–Pumped Q–Switched ND:YAG Laser." Applied Optics, Optical Society of America, Washington, US, vol. 37, No. 3, Jan. 20, 1998, pp. 551–554, XP000733906, ISSN: 0003–6935.
EP Search Report for European Patent Application No. EP 03090458.5 mailed Feb. 4, 2005.

* cited by examiner

*Primary Examiner*—Thuy V. Tran
*Assistant Examiner*—Hung Tran Vy
(74) *Attorney, Agent, or Firm*—Christie, Parker & Hale, LLP.

(57) ABSTRACT

A harmonic system for use with metals and alloys such as titanium, steel, copper, gold, aluminum, etc. is disclosed. The harmonic laser system includes an oscillator cavity having a first end mirror and a harmonic separator mirror, an active medium positioned in the oscillator cavity, an electro-optic pump device for optically pumping the active medium to produce a first optical beam at a fundamental wavelength and a non-linear optical crystal positioned in the oscillator cavity to generate a second optical beam at a harmonic wavelength of the first optical beam, wherein the harmonic separator mirror outputs the second optical beam and reflects the first optical beam.

22 Claims, 3 Drawing Sheets

GREEN WELDING LASER

FIELD OF THE INVENTION

The present invention generally relates to optical harmonic generators and, more particularly relates to an optical harmonic generator for generating a laser output beam for use in a laser spot or seam welding system.

BACKGROUND

Recently, lasers have been used in industrial production, particularly for welding, cutting, and surface treatment. In practice laser welding technology is increasingly gaining importance because of the high precision and processing speeds that can be achieved, the low thermal stress on the workpiece, and the high degree of automation which is possible. Current laser welding systems often use a $CO_2$ (carbon dioxide) laser which produces a light beam having a wavelength of 10.6 μm (micro meters), or a solid-state device such as the Nd:YAG laser (Neodymium Yttrium Aluminum Garnet) laser, which produces a light beam having a wavelength of approximately 1.064 μm.

However, light from a $CO_2$ laser may not couple with or be efficiently absorbed by certain metals and alloys. For example, the higher wavelength light of typical $CO_2$ lasers may be significantly reflected by metals and alloys such as titanium, steel, etc. at room temperature. Similarly, YAG lasers that are often used for low power (<500 W (watts)) welding applications may not couple well or be efficiently absorbed by metals such as copper, gold, aluminum, etc. at room temperature.

Current laser welding systems typically compensate for poor absorption by increasing the peak power of the laser pulse to overcome the metal's initial resistance to coupling at room temperature. The absorption significantly increases when the metal reaches its melting temperature. However, before reaching the melting temperature the use of a high energy pulse may result in considerable inefficiency in that a significant portion of the laser beam may not be absorbed during the onset of the pulse. In addition, once the laser pulse couples with the material, the high peak power may add too much energy and cause the material to splash (radiate drops of molten metal) or cause unwanted vaporization of the metal and alloy components. The undesirable inefficiency and splashing may lead to inconsistent weld results.

SUMMARY OF THE INVENTION

In an exemplary embodiment according to the present invention, a laser welding system includes an oscillator cavity having a first end mirror and a harmonic separator mirror, an active medium positioned in the oscillator cavity, an electro-optic pump device for optically pumping the active medium to produce a first optical beam at a fundamental wavelength and a non-linear optical crystal positioned in the oscillator cavity to generate a second optical beam at a harmonic wavelength of said first optical beam, wherein the harmonic separator mirror outputs the second optical beam and reflects the first optical beam.

In another exemplary embodiment according to the present invention, a method of generating a second optical beam having a harmonic wavelength of a wavelength of a first optical beam is provided. The method includes: generating the first optical beam having the fundamental wavelength by optically pumping an active medium; directing the first optical beam to a non-linear optical crystal to generate the second optical beam having the harmonic wavelength; and directing the first and second optical beams to a harmonic separator mirror that passes through the second optical beam and reflects the first optical beam.

BRIEF DESCRIPTION OF THE DRAWINGS

These and other features, aspects, and advantages of the present invention will become better understood with regard to the following description, appended claims, and accompanying drawings where:

DETAILED DESCRIPTION

An exemplary embodiment of the present invention provides a method and apparatus for generating an Nth harmonic frequency beam ($N \geq 2$). In accordance with an exemplary embodiment, the harmonic, optical generator may comprise an electro-optic pumping device (e.g., laser diode, flash lamp, etc.) that produces an output pumping radiation which is optically coupled into an active medium disposed within an optical resonator to pump the active medium and to excite the optical resonator at a fundamental wavelength. In the described exemplary embodiment a non-linear electro-optic medium may be coupled to the excited, fundamental optical mode of the optical resonator to produce a non-linear interaction with the fundamental wavelength producing harmonic wavelength photons. The advantages of the present invention may be best understood in the context of an exemplary application, such as, for example, a laser welding system.

Figure 1:
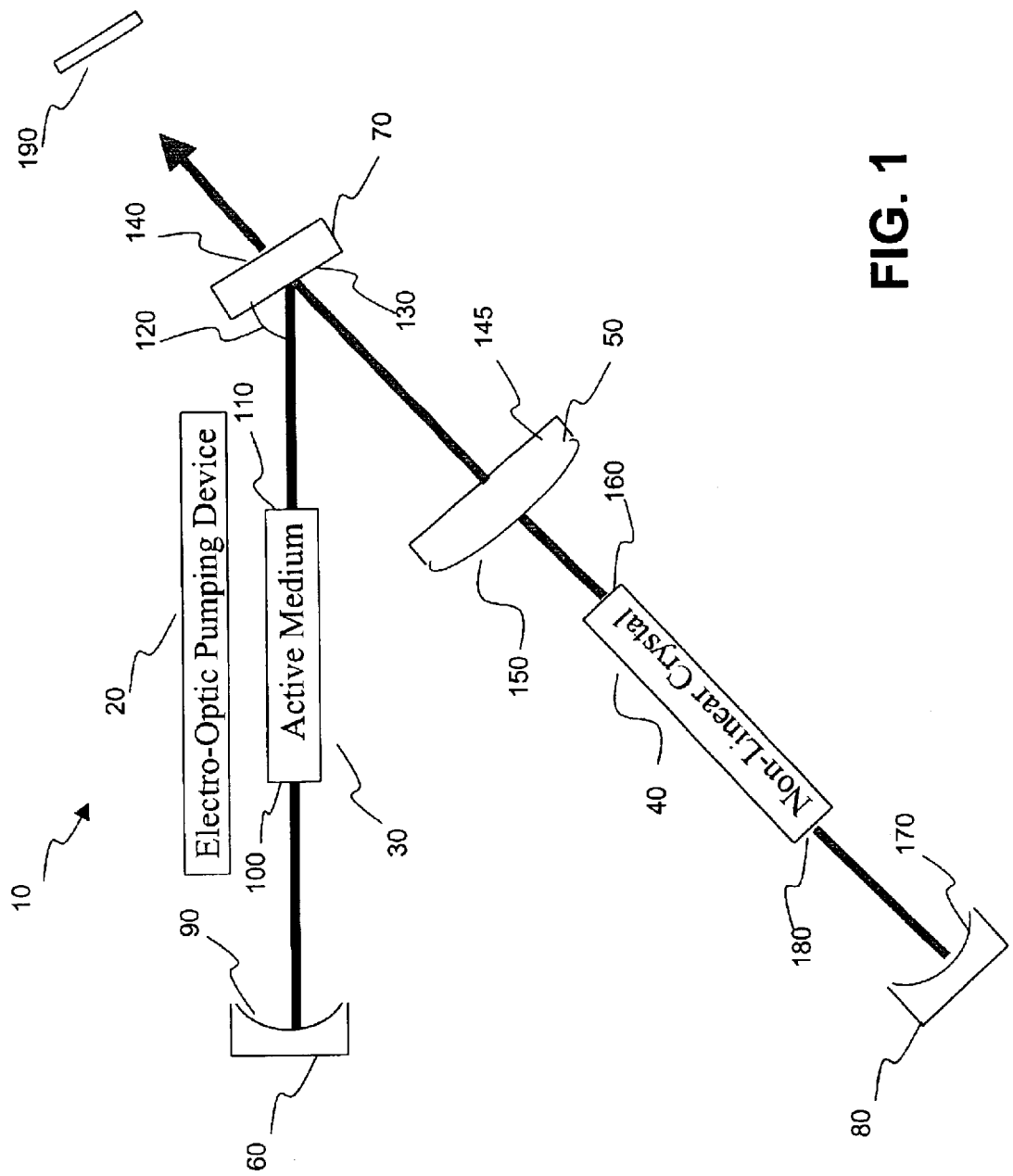
FIG. 1 is a simplified block diagram of an optical harmonic generator in a folded cavity optical resonator for use in a laser welding system in an exemplary embodiment according to the present invention.

FIG. 1 is a simplified schematic diagram of an exemplary optical harmonic generator 10 for generating an optical beam to weld a workpiece 190. The optical beam may either be pulsed or may be a continuous wave. The described exemplary optical generator may comprise an electro-optic pumping device 20 optically coupled to an active medium 30 such as, for example, an Nd:YAG rod, disposed within a folded cavity optical resonator to pump the active medium and to excite the optical resonator at a fundamental wavelength. In an exemplary embodiment, the electro-optic pumping device may be a flash lamp. In other embodiments, the active medium 30 may be excited by a laser diode or other suitable pumping device known to those skilled in the art.

According to the exemplary embodiments of the present invention, the active medium may be selected in accordance with the desired laser characteristics such as laser fluorescent lifetime and optical and mechanical properties. For example, the active medium may include a lasing crystal, gaseous medium, or any other suitable lasing medium known to those skilled in the art.

In an exemplary embodiment according to the present invention, a non-linear electro-optic medium 40 such as a KTP (Potassium Titanyl Phosphate) or LBO (Lithium Triborate) crystal may be coupled to the excited, fundamental mode of the optical resonator to produce a non-linear interaction with the fundamental wavelength producing a harmonic. The harmonic of a laser light may be defined as another laser light with a frequency that is multiple of the fundamental frequency (i.e., the frequency of the original laser light). In other words, a whole number integer times the wavelength of the harmonic equals the fundamental wavelength (i.e., $\lambda_f = N\lambda_h$).

In operation electromagnetic radiation propagating through the non-linear crystal 40 interacts with dipoles in the crystal causing them to oscillate. In practice the amplitude of the vibration and eventually the harmonics produced increases with increasing power density of the radiation. Therefore, conventional harmonic systems used, for example, in Q-switching applications, typically utilize high peak (e.g., 20–100 kW) power, low divergence, and short pulsewidth (e.g., <1 μsec, and typically in the nano seconds range) optical beams that may be efficiently converted from a fundamental optical wavelength to a harmonic. Due to the short pulse width, the heat input necessary for most welding situations is not generated.

However, harmonic generators utilized in applications such as, for example laser welding systems that utilize a long pulse width (e.g., >200 μsec) or continuous wave, relatively low peak (1–10 kw) power, relatively high divergence, output beam provide a relatively low conversion efficiency. Therefore, an exemplary embodiment of the present invention may further comprise a focusing lens 50 within the resonator that increases the power density of the optical beam at the fundamental wavelength incident upon the non-linear crystal 40 to increase the conversion efficiency from the fundamental wavelength to a harmonic wavelength. The focusing lens 50 compensates for high divergence and increases conversion efficiency. For example, the conversion efficiency may be less than 0.01% without the focusing lens 50 while about 40% with the focusing lens 50. This way, harmonics having increased power density may be realized without imposing the limitation to the pulsewidth associated with using a Q-switch inside the laser cavity in the lasing path. In other words, while Q-switches can be used to generate optical signal having harmonic wavelength, they can typically generate only pulses having widths of less than 1 μsec, which may be suitable for precision drilling or marking, but not typically for laser welding. In the exemplary embodiments of the present invention, harmonics are generated using one or more non-linear crystals without using a Q-switch, thus providing capabilities to generate harmonics with long pulse widths (e.g., >200 μsec and typically about 3 msec) or continuous wave output. The increased pulse widths allow for long interaction with the workpiece while maintaining sufficient laser energy to melt the material, thus better allowing for laser welding.

In the described exemplary embodiment, the active medium 30 and the non-linear crystal 40 are disposed on the optical beam paths of a triangular oscillator cavity defined by three reflectors (or mirrors) 60, 70 and 80. In the described exemplary embodiment, an end mirror 60 may have a concave reflective surface 90 coupled with a first output surface 100 of a rod shaped active medium 30 (e.g., lasing crystal). In one embodiment, the concave reflective surface 90 of the end mirror 60 may be coated with a high reflectivity coating at the fundamental wavelength (e.g. 1.064 μm).

For example, in the described exemplary embodiment, the concave reflective surface 90 may be coated with a multi-layer dielectric coating having a reflectivity greater than about 99% at the fundamental wavelength. In addition, the concave reflective surface 90 of the end mirror 60 may be anti-reflective at the wavelength of the electro-optic pumping device 20. Further, output surfaces 100 and 110 of the active medium 30 may be substantially planar and may be coated with an anti-reflective coating at the fundamental wavelength (e.g. 1.064 μm).

In the described exemplary embodiment, the output face 110 of the active medium 30 may be optically coupled to a harmonic separator output mirror 70. In the described exemplary embodiment the harmonic separator mirror 70 may be oriented at an angle 120 in the range of about 20–160 degrees with respect to the optical axis of the active medium 30. Further, the harmonic separator output mirror 70 may comprise optical quality glass, such as polished high purity fused silica ($SiO_2$) or other materials known in the art such as for example, molded optical grade plastic, GaAs (Gallium Arsenide), $CaF_2$ (Calcium Fluoride), or the like. In an exemplary embodiment, a surface 130 of the harmonic separator output mirror 70 may be highly reflective at the fundamental wavelength (e.g. 1.064 μm) and substantially transmissive at the harmonic wavelength (e.g. 532 nm (nanometer)).

Since the exemplary optical generator 10 generates output at 532 nm, it may be referred to as a green laser since the wavelength of 532 nm corresponds to green light. The harmonic wavelength of 532 nm (½ the fundamental wavelength) results because the non-linear crystal 40 in the exemplary embodiment is a doubling crystal (N=2) that doubles the laser frequency. In other embodiments, a tripling crystal (N=3), a 4× crystal (N=4), or the like may be used as the non-linear crystal to triple or quadruple the laser frequency, respectively, to result in the respective wavelengths of 355 nm and 266 nm. Further, in still other embodiments, in order to achieve quadrupling effect (N=4), two doubling crystals (N=2) may be used in series.

For example, in the exemplary embodiment, the surface 130 may be coated with a high reflectivity coating at the fundamental wavelength and an anti-reflective coating at the harmonic wavelength. In addition, a surface 140 of the harmonic separator output mirror 70 may also be coated with an anti-reflective coating at the harmonic wavelength to further improve transmission through the harmonic separator mirror 70 at the harmonic wavelength.

In the described exemplary embodiment, the focusing lens 50 may be optically coupled to the surface 130 of the harmonic separator output mirror 70 to focus optical beams at the fundamental wavelength into the non-linear electro-optic crystal 40. The focusing lens 50 may comprise for example a plano-convex lens formed from optical quality glass, such as polished high purity fused silica ($SiO_2$) or other materials known in the art such as for example, molded optical grade plastic, GaAs, $CaF_2$, or the like. In one exemplary embodiment, surfaces 145 and 150 of the focusing lens 50 may be highly transmissive at both the fundamental wavelength and the harmonic wavelength. For example, in said exemplary embodiment, the surfaces 145 and 150 may be coated with dielectric anti-reflective coatings at the fundamental wavelength and the harmonic wavelength.

In the described exemplary embodiment, the focal length of the focusing lens 50 may be in the range of about 50–500 millimeters (mm), and more specifically between about 100 mm to 150 mm. In addition, in the described exemplary embodiment the focusing lens 50 and the non-linear crystal 40 may be separated by a distance approximately equal to the focal length of the focusing lens 50 to increase the power density of the optical beam incident upon a substantially planar surface 160 of the non-linear electro-optic crystal 40.

In an exemplary embodiment, the non-linear electro-optic crystal 40 interacts with the fundamental wavelength generally producing an Nth harmonic of the frequency of electromagnetic radiation emitted by the active medium 30. In one exemplary embodiment, a KTP or LBO crystal may be coupled to the fundamental mode to produce a second harmonic. For example, in the described exemplary embodiment, the active medium 30 may comprise a Nd:YAG laser with a fundamental wavelength of approximately 1064 nm and the non-linear crystal 40 may generate an output harmonic at approximately 532 nm.

In the described exemplary embodiment, a second end mirror 80 may have a concave reflective surface 170 coupled with a second substantially flat surface 180 of the non-linear electro-optic crystal 40. In one exemplary embodiment, the reflective surface 170 of the second end mirror 80 may be coated with a high reflectivity coating at the fundamental wavelength of 1064 nm and a high reflectivity coating at the harmonic wavelength (e.g. 532 nm in this example). Therefore, optical beams exiting the non-linear crystal 40 at the fundamental and harmonic wavelength are reflected by the second end mirror 80 back to the non-linear crystal 40 where they are passed through the focusing lens 50 to the harmonic separator mirror 70.

In the described exemplary embodiment, the high reflectivity coating at 1064 nm on the surface 130 of the harmonic separator mirror 70 reflects optical beams at the fundamental wavelength back through the active medium 30 to the end mirror 60 capturing beams at the fundamental wavelength within the optical resonator. However, the harmonic separator mirror 70 is transmissive to optical beams at the harmonic wavelength, which are therefore passed out of the optical resonator. The output beam may then be incident upon the workpiece 190 for performing the desired weld operation.

The present invention is not limited to the disclosed triangular resonator configuration. Rather, one of skill in the art will appreciate that a variety of resonator configurations may be used to provide a suitable optical path between the active medium and non-linear electro-optic crystal.

Figure 2:
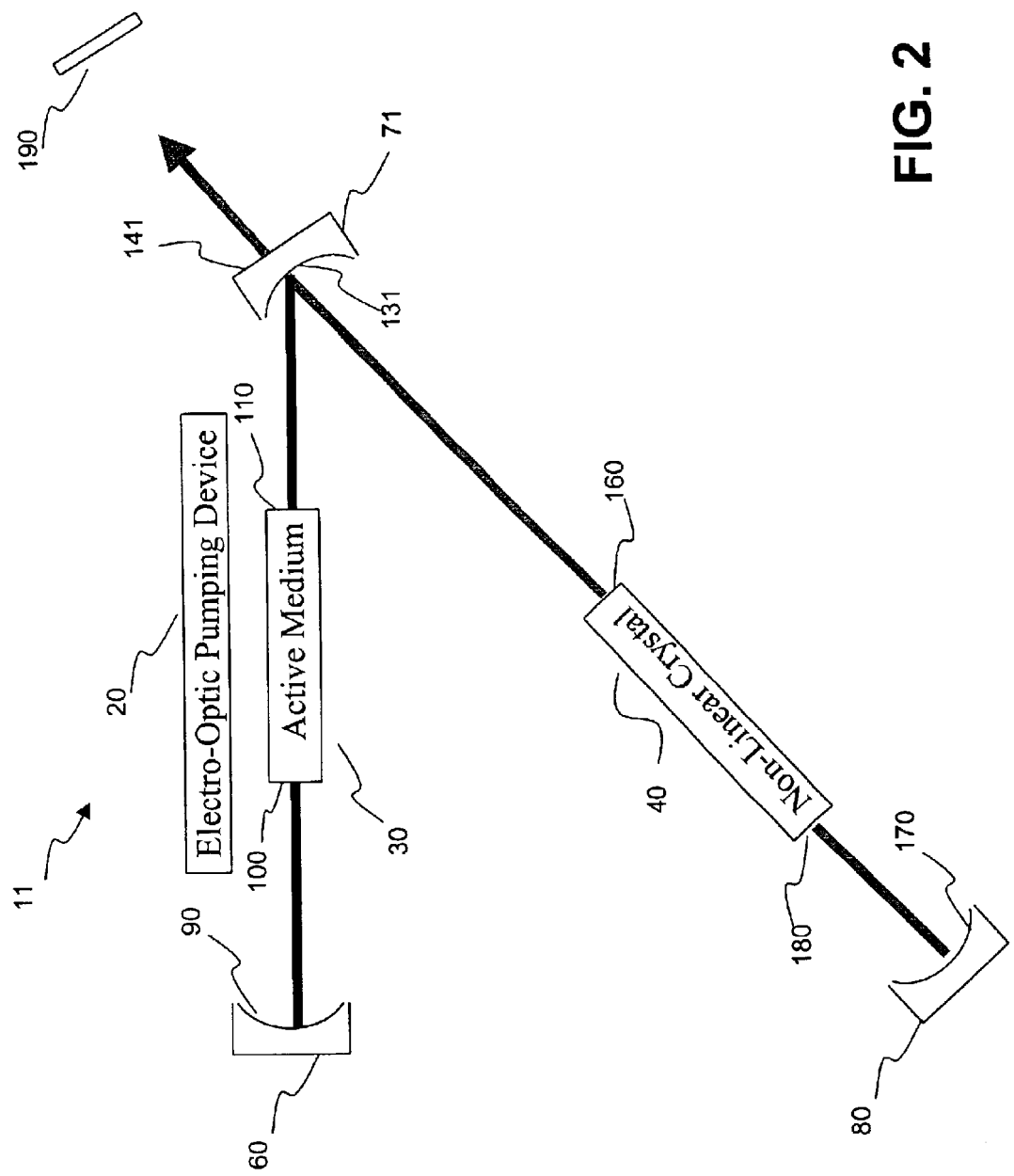
FIG. 2 is a simplified block diagram of an optical harmonic generator in a folded cavity optical resonator for use in a laser welding system in another exemplary embodiment according to the present invention.

For example, in one exemplary embodiment as illustrated in FIG. 2, a harmonic separator output mirror 71 of an optical harmonic generator 11 may comprise a concave reflecting surface 131 to focus optical beams at the fundamental wavelength into the non-linear electro-optic crystal 40 without using a focus lens. In this embodiment, the harmonic separator mirror 71 may have a radius of curvature that produces a focal length of about 50–500 mm without a focus lens. In addition, in the described exemplary embodiment the concave harmonic separator mirror 71 and the non-linear crystal 40 may be separated by a distance approximately equal to the focal length of the concave separator mirror 71.

The surface 131 may be coated with a high reflectivity coating at the fundamental wavelength and an anti-reflective coating at the harmonic wavelength. A surface 141 of the harmonic separator output mirror 71 may also be coated with an anti-reflective coating at the harmonic wavelength to further improve transmission through the harmonic separator mirror 71 at the harmonic wavelength.

Figure 3:
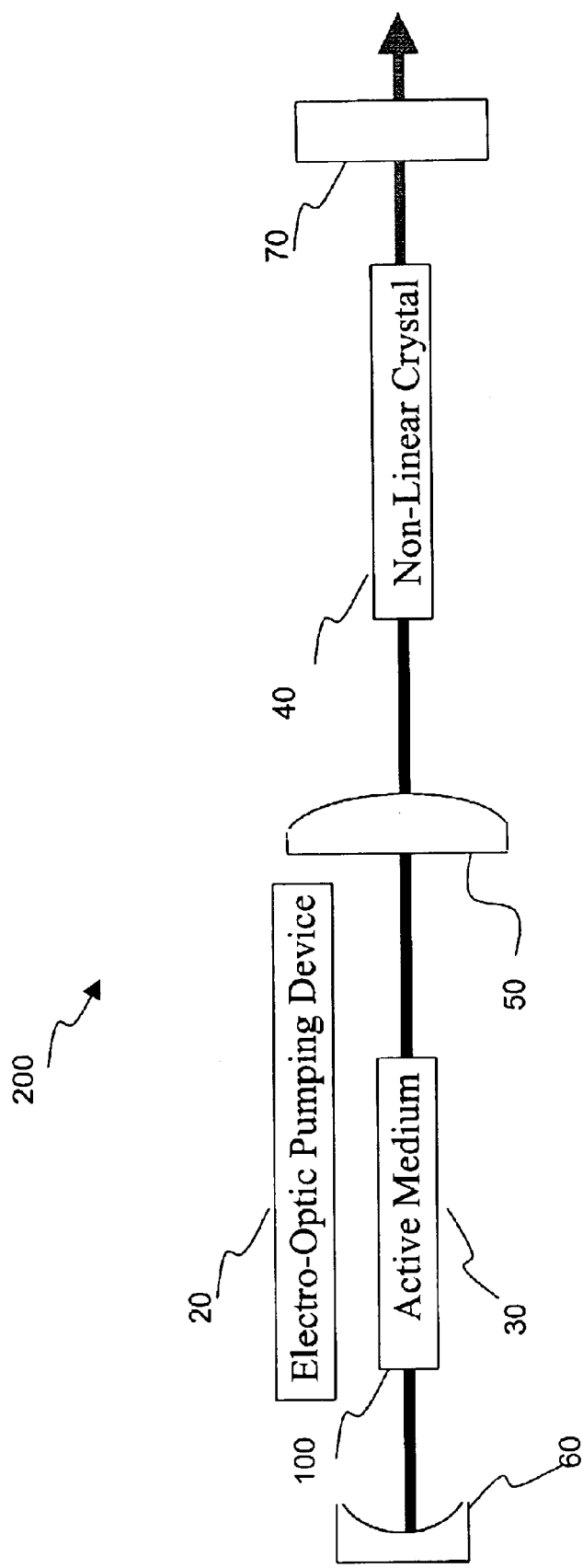
FIG. 3 is a simplified block diagram of an optical harmonic generator in a co-linear cavity optical resonator for use in a laser welding system in yet another exemplary embodiment according to the present invention.

For another example, referring to FIG. 3, the active medium 30 and the non-linear electro-optic crystal 40 may be disposed in a co-linear optical resonator 200 wherein the harmonic separator mirror 70 may again function to split the optical beam into its fundamental and harmonic components. As can be seen FIG. 3, the optical beams at fundamental wavelength and harmonic wavelength are normally (i.e., at 90 degree angle or perpendicular to) incident upon the harmonic separator mirror 70.

Although an exemplary embodiment of the present invention has been described, it should not be construed to limit the scope of the appended claims. Those skilled in the art will understand that various modifications may be made to the described embodiment and that numerous other configurations are capable of achieving this same result. Moreover, to those skilled in the various arts, the invention itself herein will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention.

For example, the exemplary embodiments of the present invention have been described mainly in reference to laser welding herein, however, the present invention may also be applied to other laser applications such as, for example, laser bending, laser heat treating and the like, as well as many other physical processes. Since laser light produces heat, and the interaction time is longer than systems using a Q-switch due to longer pulse widths or continuous wave, the present invention is suitable for various different laser applications where application of heat is needed.

What is claimed is:

1. A harmonic laser system, comprising:
   an oscillator cavity having a first end mirror and a harmonic separator mirror,
   an active medium positioned in the oscillator cavity;
   an electro-optic pump device comprising a pulsed power source for optically pumping the active medium to produce a first optical beam at a fundamental wavelength and having a peak power of 1-10 kW without using a Q-switch device;
   a non-linear optical crystal positioned in the oscillator cavity for generating a second optical beam, which is suitable for laser welding, at a harmonic wavelength of said first optical beam in response to converging the first optical beam onto the non-linear optical crystal, the harmonic wavelength being a green wavelength; and
   a focusing lens for converging the first optical beam to the non-linear optical crystal, wherein said harmonic separator mirror outputs said second optical beam and reflects said first optical beam.

2. The harmonic laser system of claim 1, wherein said second optical beam welds a first workpiece to a second workpiece.

3. The harmonic laser system of claim 1, wherein said second optical beam generates heat in a workpiece for changing material properties of the workpiece, reshaping the workpiece, or removing material from the workpiece.

4. The harmonic laser system of claim 1, wherein the focusing lens converges the first optical beam onto a surface of the non-linear optical crystal.

5. The harmonic laser system of claim 1, wherein a focal length of the focus lens is between about 100 mm and 150 mm.

6. The harmonic laser system of claim 1, wherein the first and second optical beams comprise a pulsed laser.

7. The harmonic laser system of claim 6, wherein pulse width for the pulsed laser is greater than 100 microseconds.

8. The harmonic laser system of claim 1, wherein the non-linear optical crystal is selected from a group consisting of a doubling, tripling and quadrupling non-linear crystals.

9. The harmonic laser system of claim 1, wherein the non-linear optical crystal comprises a plurality of non-linear crystals arrayed in series so as to increase the conversion efficiency of the second optical beam by generating high order (N<3) harmonics.

10. The harmonic laser system of claim 1, wherein the active medium is selected from a group consisting of a gaseous medium and a laser crystal.

11. The harmonic laser system of claim 1, wherein the electro-optic pump device is a laser diode.

12. The harmonic laser system of claim 1, wherein the active medium and the non-linear optical crystal are co-linear with one another.

13. The harmonic laser system of claim 1, wherein the oscillator cavity comprises a folded oscillator cavity wherein the first optical beam and the second optical beam are at an angle with one another, and the oscillator cavity further comprises a second end mirror co-linear with the non-linear optical crystal for reflecting both the first and second optical beams towards the non-linear optical crystal.

14. The harmonic laser system of claim 1, wherein the fundamental wavelength is 1064 nm and the harmonic wavelength is 532 nm.

15. A method of generating a second optical beam having a harmonic wavelength of a wavelength of a first optical beam having the fundamental wavelength and having a peak power of 1–10 KW, without using a Q-switch device, by optically pumping an active medium using a pulsed power source;

converging the first optical beams to a harmonic separator mirror that passes through the second optical beam and reflects the first optical beam.

16. The method of claim 15, wherein said converging comprises focusing the first optical beam onto a surface of the non-linear optical crystal.

17. The method of claim 15, wherein the first and second optical beams are normally incident upon the harmonic separator mirror.

18. The method of claim 15, wherein the first and second optical beams are incident upon the harmonic separator mirror at a non-normal angle and at an angle with each other.

19. The method of claim 15, further comprising welding a first workpiece to a second workpiece using the second optical beam.

20. The method of claim 15, further comprising generating heat using the second optical beam in a workpiece to change material properties of the workpiece, reshape the workpiece, or remove material from the workpiece.

21. The harmonic laser system of claim 1, wherein the electro-optic pump device is not in an optical path of the first optical beam or the second optical beam.

22. A harmonic laser system, comprising:

an oscillator cavity having a first end mirror and a harmonic separator mirror;

an active medium positioned in the oscillator cavity;

a flash lamp for optically pumping the active medium to produce a first optical beam at a fundamental wavelength and having a peak power of 1–10 kW without using a Q-switch device;

a non linear optical crystal positioned in the oscillator cavity for generating a second optical beam, which is suitable for laser welding, at a harmonic wavelength of said first optical beam in response to converging the first optical beam onto the non-linear optical crystal; and a focusing lens for converging the first optical beam onto the non-linear optical crystal, wherein said harmonic separator mirror outputs said second optical beam and reflects said first optical beam, and wherein the harmonic wavelength is a green wavelength.

* * * * *

UNITED STATES PATENT AND TRADEMARK OFFICE
CERTIFICATE OF CORRECTION

PATENT NO. : 7,088,749 B2
APPLICATION NO. : 10/337110
DATED : August 8, 2006
INVENTOR(S) : Nakayama et al.

It is certified that error appears in the above-identified patent and that said Letters Patent is hereby corrected as shown below:

On the Title Page

| | |
|---|---|
| (73) Assignee | After "Monrovia, CA (US)", Insert --MIYACHI TECHNOS CORPORATION, Noda City (JP)-- |
| (56) References Cited U.S. Patent Documents 6,774,881 . . . | Delete "B1", Insert --B2-- |

In the Claims

| | |
|---|---|
| Column 6, line 34, Claim 1 | Delete "mirror,", Insert --mirror;-- |
| Column 6, line 48, Claim 1 | Delete "beam to", Insert --beam onto-- |
| Column 7, line 10, Claim 9 | Delete "(N<3)", Insert --(N>3)-- |
| Column 7, line 31, Claim 15 | Delete "beam having the", Insert --beam, the method comprising: generating the first optical beam having the-- |
| Column 7, line 35, Claim 15 | Delete "converging the first optical beams", Insert --converging the first optical beam using a focus lens onto a non-linear optical crystal to generate the second optical beam having the harmonic wavelength, the second optical beam being suitable for laser welding, wherein the harmonic wavelength is a green wavelength; and directing the first and second optical beams-- |

UNITED STATES PATENT AND TRADEMARK OFFICE
CERTIFICATE OF CORRECTION

PATENT NO. : 7,088,749 B2
APPLICATION NO. : 10/337110
DATED : August 8, 2006
INVENTOR(S) : Nakayama et al.

It is certified that error appears in the above-identified patent and that said Letters Patent is hereby corrected as shown below:

Column 8, line 25, Claim 22      Delete "non linear",
                                 Insert --non-linear--

Signed and Sealed this

Twenty-third Day of September, 2008

JON W. DUDAS
*Director of the United States Patent and Trademark Office*